June 25, 1968  A. DUBOIS ET AL  3,390,288
DEVICE FOR DRIVING OUT THE COMBUSTION GASES OF
A SUBATMOSPHERIC MAGNETOHYDRODYNAMIC GENERATOR
Filed Sept. 8, 1964  3 Sheets-Sheet 1

Inventors
Andre Dubois & Georges Klein
by:
Elwin E. Greigg

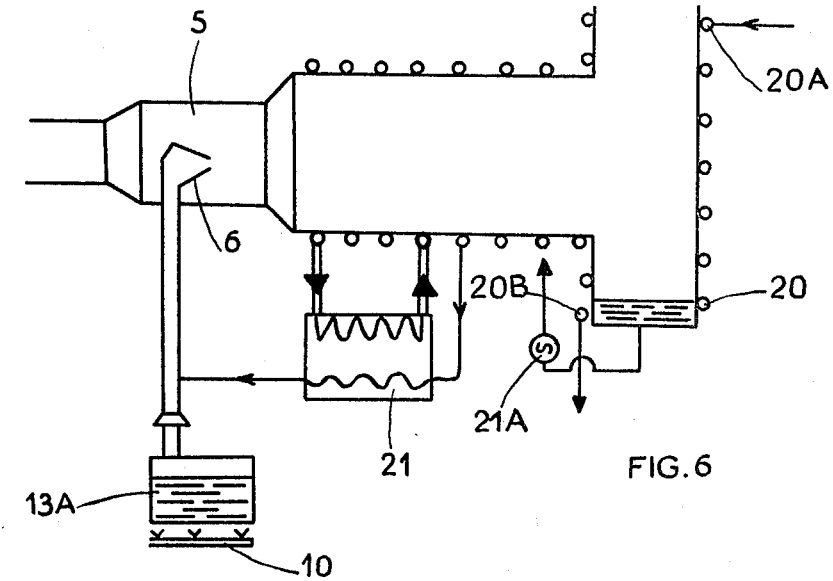
FIG. 6
FIG. 7
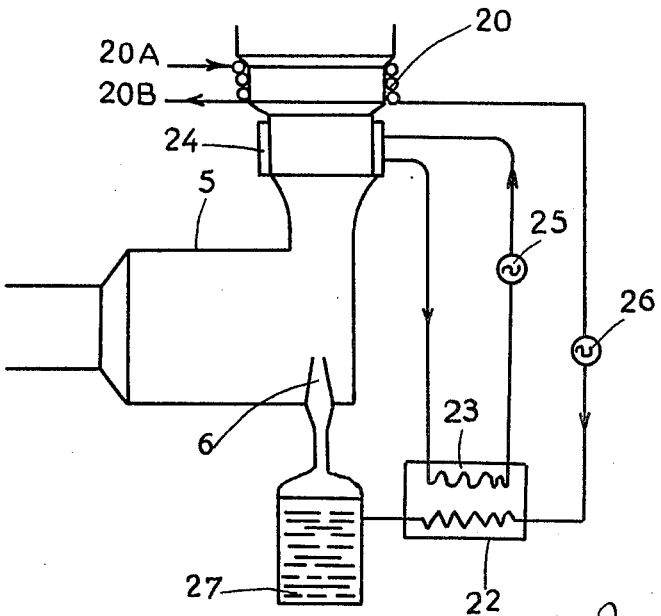

United States Patent Office 3,390,288
Patented June 25, 1968

3,390,288
DEVICE FOR DRIVING OUT THE COMBUSTION GASES OF A SUBATMOSPHERIC MAGNETOHYDRODYNAMIC GENERATOR
André Dubois, Orsay, and Georges Klein, Paris, France, assignors to Compagnie Generale d'Electricite, Paris, France, a corporation of France
Filed Sept. 8, 1964, Ser. No. 394,809
Claims priority, application France, Sept. 6, 1963, 946,830; July 29, 1964, 983,457
5 Claims. (Cl. 310—11)

ABSTRACT OF THE DISCLOSURE

A magnetohydrodynamic generator of the subatmospheric type for educting hot gases including a combustion chamber in which combustible fluids with appropriate seed particles are introduced, a duct in which the gases acquire a suitable speed, a conversion chamber connected to a slackening chamber, and at least one eduction stage which is at the same time a purifier for extracting the seed particles of the gases, and an ejector operating by means of fluids such as gases, vapors, steam, water, organic salts and the like. The ejector is connected to the slackening chamber whereby the seed particles are washed away by the condensed ejecting fluid.

---

This invention relates to devices for driving into the atmosphere the combustion gases of magnetohydrodynamic generators working at subatmospheric pressure with an open gas circuit.

It is known that the magnetohydrodynamic generators working at subatmospheric pressure present significant advantages over hyperatmospheric pressure magnetohydrodynamic generators. For example, for a given expansion ratio the length of the generators of the first type is lower than the length of the generators of the second type, for a given gas temperature and wall temperature the thermic losses of the generator of the first type are lower than those of the generators of the second type, for a given seed the conductivity of the working gas is higher in the case of subatmospheric generators, in the case of subatmospheric generators the thermic power of a generator called zero generator (i.e. the generator which produces the same quantity of energy as that required by energizing the electromagnet) is lower.

Thus the technology of subatmospheric generators appears to be the solution to the problems of constructing relatively low power generators (with regard to the hyperatmospheric generators) and the solution to the problems of constructing high power generators with a reduced length conversion duct. In practice however the realization of open circuit subatmospheric generators faces the problem of driving out a great volume of gases. Pumping devices like piston pumps, rotary vane pumps or pumps of the "Roots" type quickly do not stand up to wear because of the ashes, coal tar and alkaline residues resulting from the seed that has been added to the gases in order to render them electrically conductive. The driving devices working with water present the advantage of being very solid and easily applied but cannot be used because of the limit of pressure that cannot be exceeded owing to the pressure of the steam in balance with the liquid. The liquid ring pump working with water, glycol or oil presents a limit pressure and solidity convenient for use in magnetohydrodynamic generator but such pump makes possible the expulsion of an output of gases corresponding to a magnetohydrodynamic generator of only a few megawatts. All these systems have in common a major disadvantage: either they can be used only with gases that have already been brought up at normal temperature, or they must themselves cool the gases. In any case the thermic energy of the gases at the output of the conversion chamber is so lowered during their expulsion that it must be considered as lost.

The present invention has for its purpose to meet this difficulty by providing a device for eduction of the hot gases of a subatmospheric generator including a combustion chamber, a duct in which the gases acquire a suitable speed, a conversion chamber connected to a slackening chamber, means for introducing combustible fluids with appropriate seed particles into the combustion chamber. The device in accordance with the principles of this invention includes at least one first eduction stage which is at the same time a purifier able to extract the seed particles of the gases, the first stage includes an ejector working by means of fluids such as gases, vapours, steam, water, organic salts and so on. The ejector opens on to the slackening chamber, whereby the seed particles are washed away by the condensed ejecting fluid.

Accordingly, one of the objects of this invention, is to provide an eduction device for subatmospheric generators wherein the particles forming the seed are dragged away by the ejecting fluid when it is condensed making possible the purification of the working gas.

Another object of this invention is to provide a device constructed according to the principles of this invention that present no rotary elements and wherein the ejecting device is durable and substantially wear resistant.

Other features and advantages of the device of the invention will appear in the following description and drawings in which:

FIG. 6 is a schematic view of yet another embodiment of the invention utilizing a compound ejector fluid; and FIG. 7 is a schematic view of another embodiment of the invention utilizing a generator operating continuously without external heat contribution.

Figure 1:
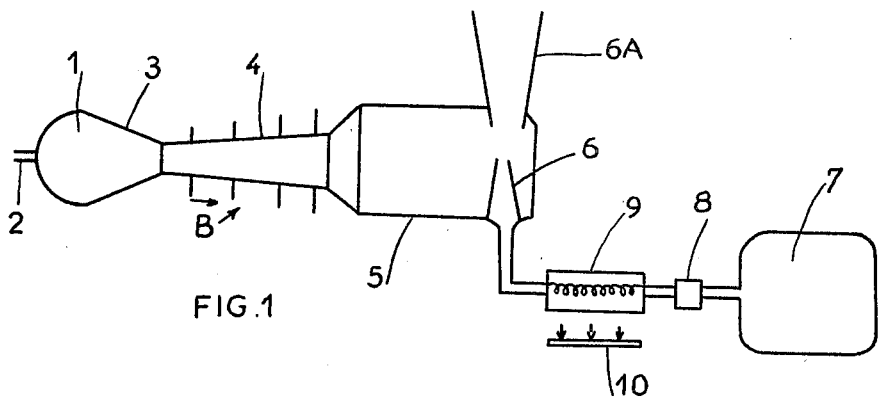
FIG. 1 is a schematic view of one embodiment according to the principles of this invention.

Referring now to FIG. 1, the combustion chamber 1 with its burner 2 is connected to the duct 3 in which the gases acquire sufficient speed. A magnetic field B is applied to the conversion chamber or magnetohydrodynamic chamber 4. A slackening chamber 5, in which the speed of the gases decreases, includes an ejector, able to eject a jet of compressed gas, reference 6 showing a nose-piece and an ejection pipe 6A.

This compressed gas, stored in a reservoir 7, passes through a pressure-reducer 8 and a thermal exchanger 9 in which it is heated by means of an auxiliary burner 10, before being sent into the slackening chamber 5, such a device, in which the working fluid of the ejector associated to a subatmospheric magnetohydrodynamic generator is a compressed gas (compressed air for example) being particularly advantageous when the generator is movable and must work during short periods. It is possible to use a reservoir refilled at a stationary installation that is not necessarily situated in the vicinity of the generator. Thus the generator includes no rotary elements and presents a compact form and relatively small size with regard to its power. In the case of a supersonic ejector, for increasing its yield it is of interest to use a gas reheated in an installation such as those represented in FIGURE 1.

Figure 2:
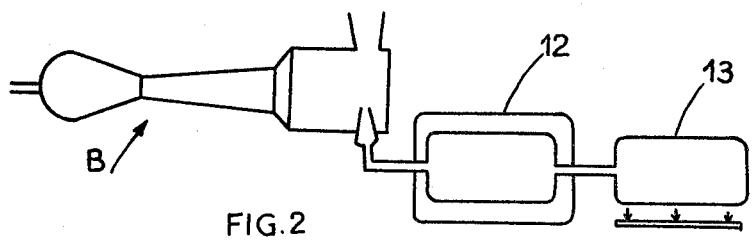
FIG. 2 is a schematic view of another embodiment of the invention utilizing a fixed generator which operates intermittently with regard to time.
Figure 3:
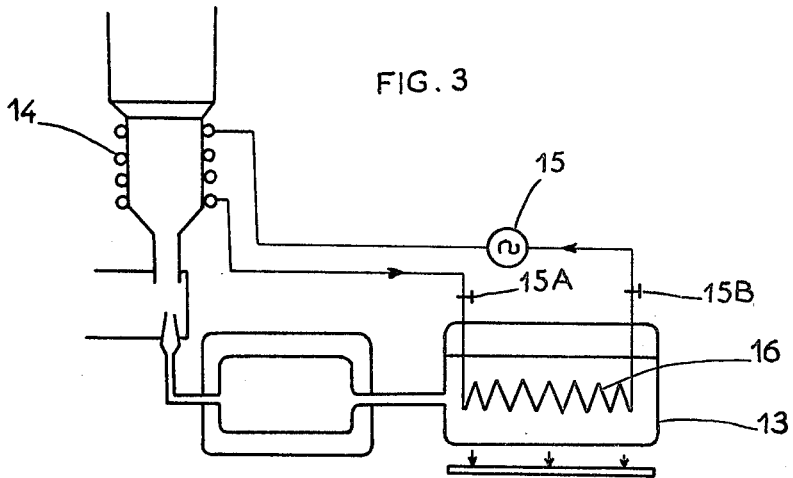
FIG. 3 is a schematic view of the embodiment shown in FIG. 2 which is further provided with a heat recuperator.

In FIG. 2 the ejector is a steam ejector supplied with steam by steam accumulator 12, the steam coming from a steam boiler 13. FIG. 3 corresponds to FIG. 2 in which there is provided a heat recuperator 14, making it possible to recoup the thermal losses of the combustion gases and the ejected steams. The recuperation circuit comprises the recuperator 14, a pump 15 and a heat exchanger 16 placed in the steam boiler 13. Two taps 15A and 15B make possible the control of the recuperation fluid flow. Such a circuit allows the extension of the life of the installation.

Figure 4:
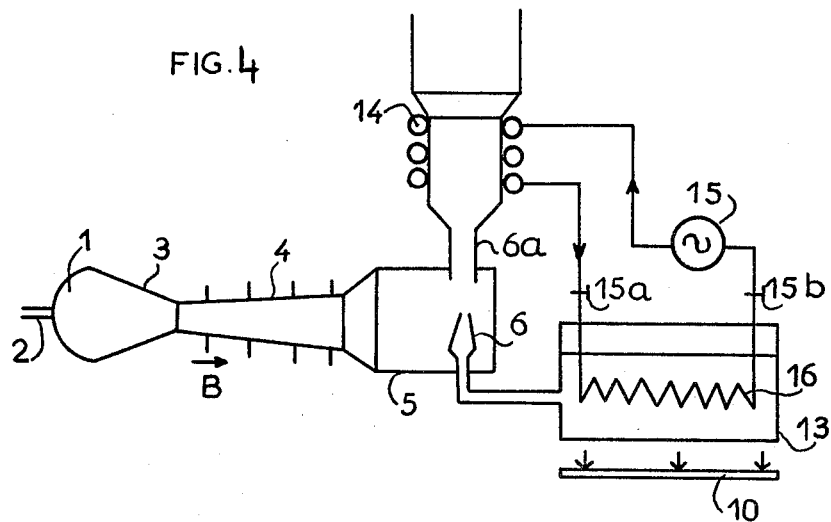
FIG. 4 is a schematic view of the embodiment shown in FIG. 3 without the use of a steam accumulator, the evaporation of the water taking place in the ejector.

Another embodiment of the circuit of FIG. 3 is schematically shown by FIGURE 4, in which there is no steam accumulator, the evaporation of the water taking place in the ejector. Therefore, the ejector will be supplied, at a constant rate, with recuperated calories corresponding to the part of the enthalpy that has not been converted in electric energy.

Figure 5:
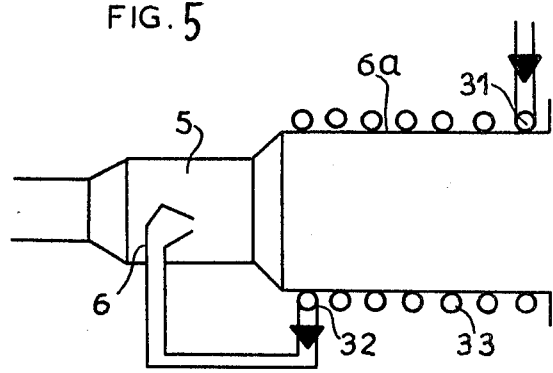
FIG. 5 is a schematic view of another embodiment of the invention in which a water ejector is supplied with cold water which has been reheated by passing through a heat recuperator.

In FIG. 5 a water ejector is supplied with cold water that has been reheated by passing through a heat recuperator. The slackening chamber 5 comprises the nose-piece 6 and the ejection duct 6A that forms the end part of said chamber 5. The cold water is supplied to the input 31 of the heat recuperator 33 that consists for example of a coil of tubing wound around the ejection duct 6A and connected to the nose-piece 6. The ejector is arranged to produce a good atomization of the water and for a given diameter of the water drops there will be complete evaporation during the expansion of the water in the flow of hot gases. Thus, the pressure of the hot gases will increase as if there has been injected an equivalent quantity of hot water or steam.

FIG. 6 illustrates the case of a stationary generator used discontinuously and for which it is of interest to lower the cost of the steam and of the necessary fuel. In this case the ejection fluid is a compound having good stability with regard to the heat, the oxygen, the water and the seed and having a boiling point different from the water boiling point (preferably higher) and having a low specific evaporation heat. Such a compound may be, for example, the fluorocarbon, the chemical formula of which is $(C_4F_9)_3N$ which is stable at about 320° C. and boils at around 177° C. Compounds other than fluorocarbon presenting a boiling point lower than 100° C. may be used as ejection fluids: fluorobenzen, silcon tetrachloride, ethyliodid, methylpropionate, ethylformiate, propylformiate, etc.

The ejection fluid is stored in a boiler 13A which is heated by an auxiliary heating device 10. The ejected vapour is condensed by means of a condenser 20 judiciously placed and cooled by a water circuit, the cold water arriving through the input 20A, the hot water flowing out through the output 20B. The condensed vapour driven by a pump 21A is reheated and evaporated in the thermal exchanger 21 and sent back to the ejection fluid circuit, the thermal exchanger recouping the thermal losses of the combustion gases and the ejection steam at a temperature of between 400 and 200° C. This returning of the ejection fluid makes possible provision of more than one third of the total quantity of ejected steam or vapours.

FIG. 7 illustrates the case of a generator working continuously without any external heat contribution. In this case use is made of a fluid presenting a lower specific evaporation heat than water (for example 10 or 20 times less) and the boiling point of which is lower than 200° C. As a matter of fact the combustion gases lose a great quantity of heat between the output of the conversion duct and the part of the duct where the temperature is equal to the evaporation temperature of the ejecting fluid. This quantity of heat is, allowance being made for the efficiency of the ejector and the heat exchangers, higher than the quantity of heat necessary to evaporate the ejection fluid. The ejected steam or vapour is separated from the combustion gases by condenser 20 judiciously placed and cooled by water flowing in the coil of tubing (20A–20B). The condensed vapour then passes through a heat exchanger 22 which is supplied with calories by a heating device 23, of the coil tubing type, using the heat of the recuperator 24. Afterwards the condensed vapour is injected into an overheating device 27 that helps to increase the vapour pressure. The reference numerals 25 and 26 designate pumps for driving the fluids.

In the case of generators that operate for a limited time, the use of gas or steam ejectors enables omission of any movable element, only the gases being in motion. Such generators, therefore, may be rendered portable. In the case of a generator having to operate over long periods of time, the water steam used as ejecting fluid enables construction of a generator that is solid, reliable and not complicated in its construction. Other vapours besides those above-mentioned may make possible a correct continuous functioning with or without heat contribution from an external heating source.

According to another embodiment of the present invention the device for eduction of the hot gases of a subatmospheric generator of the magnetohydrodynamic type includes a first ejection stage comprising a gas, steam, organic salts or other described ejector and a second ejection stage comprising a mechanical pumping device with components such as piston pumps, vane pumps or "Roots" type pumps.

As a matter of fact, in this case the first ejection stage purifies the gases while the ejecting fluid is condensed; thus it is possible to use a second stage including mechanical pumping device or mechanical compressor owing to the fact that the wear caused by the seed is considerably reduced.

Adding of a second ejection stage comprising a mechanical pumping device makes possible an increase of the mechanical efficiency of the generator by reducing the quantity of thermal energy used.

According to another embodiment the device for eduction of the hot gases includes the same first ejection stage, the second including a pumping device of a water aspirator type. Such an embodiment advantageously allows an increase of the pressure reduction produced with the same quantity of energy supplied to the ejection device.

More especially it is possible to gather in parallel several ejection devices of the above-mentioned types allowing in this way ejection of the combustion gases whatever is the size of the generator.

Obviously the reach of the invention is not limited to the embodiments described in the present specification only as examples. In particular, it is possible, in the scope of the invention to bring minor modifications, to change some arrangements or to replace some means by equivalent means.

We claim:

1. In a magnetohydrodynamic generator of the subatmospheric type for educting hot gases, the combination comprising, a combustion chamber having a duct for the working gases to acquire a suitable speed, a conversion chamber, a slackening chamber connected to said conversion chamber, means for introducing combustible fluids with seed particles in said combustion chamber, at least one eduction stage for extracting said seed particles of said working gases, and stage including an ejector operating by vapor means, and said ejector being connected to said slackening chamber whereby said seed particles are washed away by the condensed ejecting fluid.

2. A device for eduction of hot gases according to claim 1 in which the ejecting fluid is fluorocarbon $(C_4F_9)_3N$, the vapour of said fluorocarbon being supplied by a boiler, means for recuperating said fluorocarbon by fractionated condensation and means for returning said fluorocarbon to said ejecting fluid circuit after passing through a heat exchanger for recuperating the remaining calories of said combustion gases and ejected vapours.

3. A device for eduction of hot gases according to claim 1 in which the ejecting fluid is a compound the specific evaporation heat of which is lower than that of water and the boiling temperature of which is lower than 200° C., said compound being selected from the group consisting of fluorocarbon, silicon tetrachlorid, methyliodid, methyl propionate, ethylformiate and propylformiate, the vapour of said compound being recuperated by a condenser and injected again in liquid state into a superheater in which said ejecting fluid is stored after passing through a heat exchanger recuperating the heat of said combustion gases and ejected vapours.

4. In a magnetohydrodynamic generator of the subatmospheric type for educting hot gases, the combination comprising, a combustion chamber having a duct for the working gases to acquire a suitable speed, a conversion chamber, a slackening chamber connected to said conversion chamber, means for introducing combustible fluids with seed particles in said combustion chamber, at least one eduction stage for extracting said seed particles of said working gases, and stage including an ejector operating by steam, said steam being fed by a boiler partly heated by heat recovering means for the combustion gases and ejected steams, said recovering means including a recuperator, a pump for driving a thermal fluid, and heating device utilizing a coil of tubing immersed in said boiler, and said ejector connected to said slackening chamber whereby said seed particles are washed away by the condensed ejecting fluid.

5. A device for eduction of hot gases emitted by magnetohydrodynamic generator for the subatmospheric type including a combustion chamber, a duct in which the working gases acquire a suitable speed, a conversion chamber connected to a slackening chamber, and means for introducing combustible fluids with appropriate seed particles in said combustion chamber, at least one eduction stage which is at the same time a purifier able to extract the seed particles of the working gases, said stage including an ejector operating by water, said water being previously preheated in a recuperating circuit for recuperating the heat of the combustion gases and ejected steams, said recuperating circuit including a coil to be wound around a hot gases eduction duct, said water being atomized at the extremity of the nose-piece of said ejector, and said ejector connected to said slackening chamber whereby said seed particles are washed away by the condensed ejecting fluid.

References Cited

UNITED STATES PATENTS

| | | | |
|---|---|---|---|
| 1,509,103 | 9/1924 | Elliot | 310—11 |
| 3,214,616 | 10/1965 | Way et al. | 310—11 |
| 3,303,364 | 2/1967 | Hals | 310—11 |

FOREIGN PATENTS

| | | |
|---|---|---|
| 191,739 | 11/1907 | Germany. |

MILTON O. HIRSHFIELD, *Primary Examiner.*

DAVID X. SLINEY, *Examiner.*